Nov. 8, 1966 L. KATZMAN ETAL 3,283,478
HUMIDIFIER
Filed June 24, 1964 2 Sheets-Sheet 1
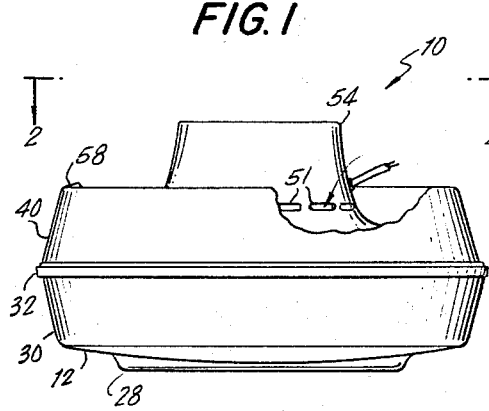
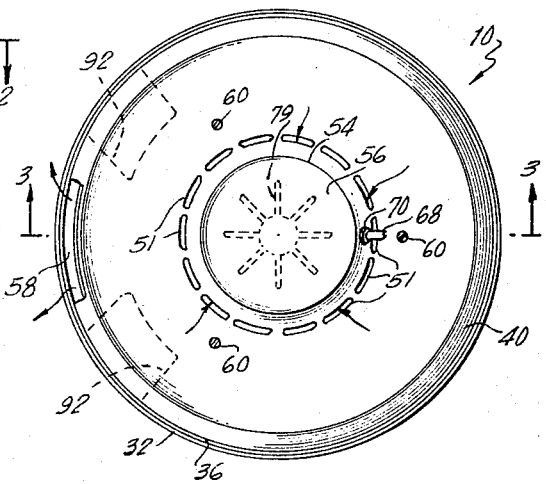
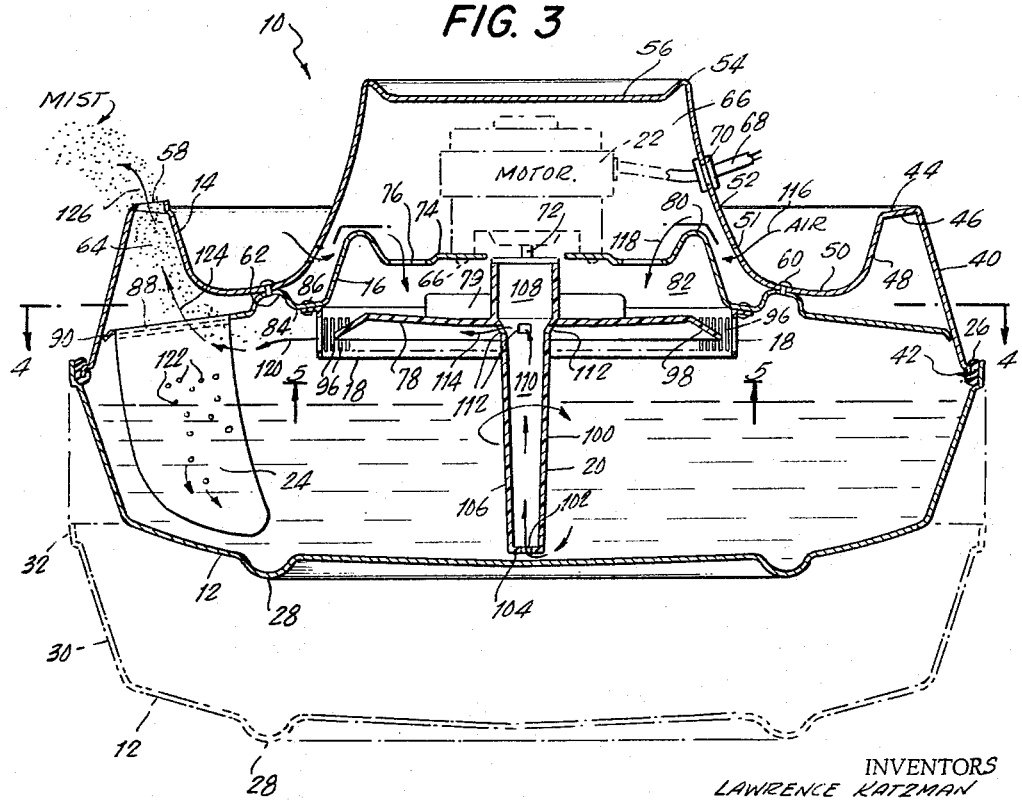
INVENTORS
LAWRENCE KATZMAN
EDWARD BRIGGIN
BY EDWARD M. STOLARZ
ANTHONY N. D'ELIA
Briskin & Goldfarb
ATTORNEYS Nov. 8, 1966 L. KATZMAN ETAL 3,283,478
HUMIDIFIER
Filed June 24, 1964 2 Sheets-Sheet 2

INVENTORS
LAWRENCE KATZMAN
EDWARD BRIGGIN
EDWARD M. STOLARZ
BY ANTHONY N. D'ELIA

ATTORNEYS

3,283,478
HUMIDIFIER

Lawrence Katzman, New York, Edward Briggin, Brooklyn, Edward M. Stolarz, New York, and Anthony N. D'Elia, Riverdale, N.Y.; said Briggin, Stolarz, and D'Elia assignors to Kaz Manufacturing Co., Inc., New York, N.Y., a corporation of New York
Filed June 24, 1964, Ser. No. 377,731
2 Claims. (Cl. 55—230)

This invention relates to a vaporizer or humidifier of the type used in spraying mist in the form of cool water and air for treatment of various medical disorders as well as for beneficially increasing the humidity of a room or other enclosure.

In the past, various types of vaporizers and humidifiers have been produced for delivering a controlled spray of moisture laden air. However, this spray contained heavy drops or droplets of water which would often cause the formation of sizable puddles and which would reduce the effectiveness of the humidifier. It is therefore one of the important objects of the present invention to provide a humidifier which has means in the form of a novel wind tunnel and vane arrangement for returning heavy droplets of water back into the container for further breakup into a fine mist spray and for delivering the mist in the form of a very fine spray outwardly at a controlled speed so that the spray will be directed at a wide angle from the humidifier.

A further object of the present invention resides in the provision of a humidifier which is constructed so that the top and associated mounting plate and motor and baffle can all be simultaneously raised from the container when it is desired to refill the container, thus facilitating the use of the humidifier.

An additional object of the invention resides in the provision of a novel circular wind tunnel for building up the density of the fine mist spray, while preventing the accumulation of heavy droplets of water and preventing the droplets from passing outwardly of the vaporizer.

Yet another object of the invention resides in the provision of a vaporizer having a mounting plate so arranged as to divide the top into a drive motor chamber and a wind tunnel, the mounting plates also carrying suitable vanes which extend into the container filled with fluid being vaporized so that in effect the entire assembly is strengthened, while the mist eventually sprayed outwardly of the vaporizer is enhanced in composition and density.

Still another object of the invention resides in the provision of a humidifier which is so constructed that the vane which extends into the container reduces agitation of the fluid contained in the container, thus increasing the efficiency of the humidifier, while permitting a more localized agitation of the water so that fluid will be sucked into a hollow impeller for direction against a circumferential baffle plate and then through a wind tunnel and outwardly of the humidifier. The construction of this humidifier features the use of a container having a top detachably connected thereto, which top has a raised ring-shaped portion of substantially inverted U-shape in cross section. A mounting plate is secured to the top about an entire circular area of contact so as to separate the spaces between the mounting plate and the top into a drive motor chamber and a wind tunnel.

A motor is mounted in the chamber and drives a hollow impeller which extends into the container for drawing fluid from the container upwardly and to direct the fluid against a baffle which depends from the mounting plate for forming a suitable mist. The mist is directed upwardly through the wind tunnel and outwardly through an outward opening and such fluid droplets that are formed are deflected by suitable vanes back into the container.

Still further objects and features of this invention reside in the provision of a humidifier or vaporizer which is strong and durable, capable of being molded out of various readily available plastic materials or which may be stamped or otherwise formed out of aluminum or like material. It has been found that aluminum is especially adopted for use in this invention and provides for an exceedingly lightweight yet highly efficient and strong humidifier, while being pleasing in appearance. The invention is relatively inexpensive to manufacture, thereby permitting wide use and distribution.

These, together with the various ancillary objects and features of the invention, which will become apparent as the following description proceeds, are obtained by this humidifier, a preferred embodiment of which has been illustrated in the accompanying drawings, by way of example only, wherein:

FIG. 1 is a side elevational view of the humidifier shown with a portion of the wind tunnel being broken away to illustrate other parts in detail;

FIG. 2 is a top plan view of the vaporizer looking downwardly thereon in the direction of the arrows 2—2 in FIG. 1, with openings in the mounting plate being shown in phantom line;

FIG. 3 is an enlarged vertical sectional view, taken along the plane of line 3—3 in FIG. 2, illustrating the construction of various component parts of the invention in detail;

Figure 4:
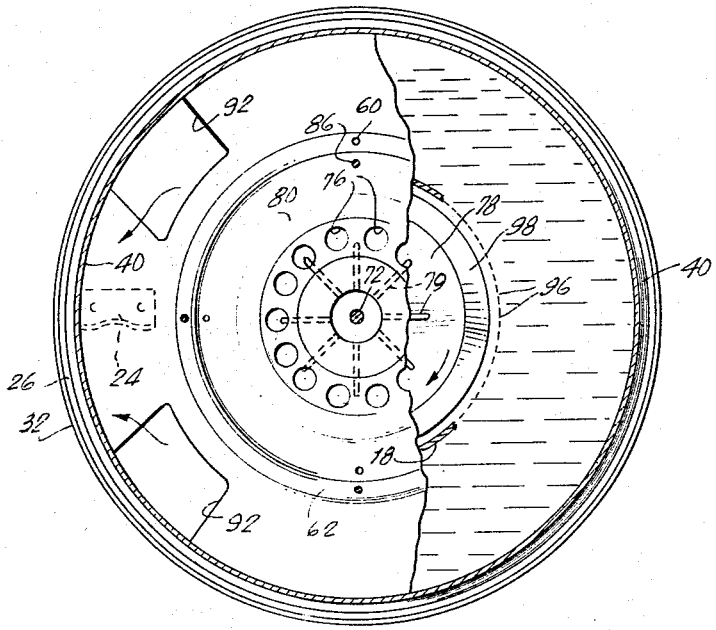
FIG. 4 is a horizontal sectional view in a slightly reduced scale, taken along the plane of line 4—4 in FIG. 1, with a portion of the mounting plate being broken away to show details of construction.
Figures 5, 6:
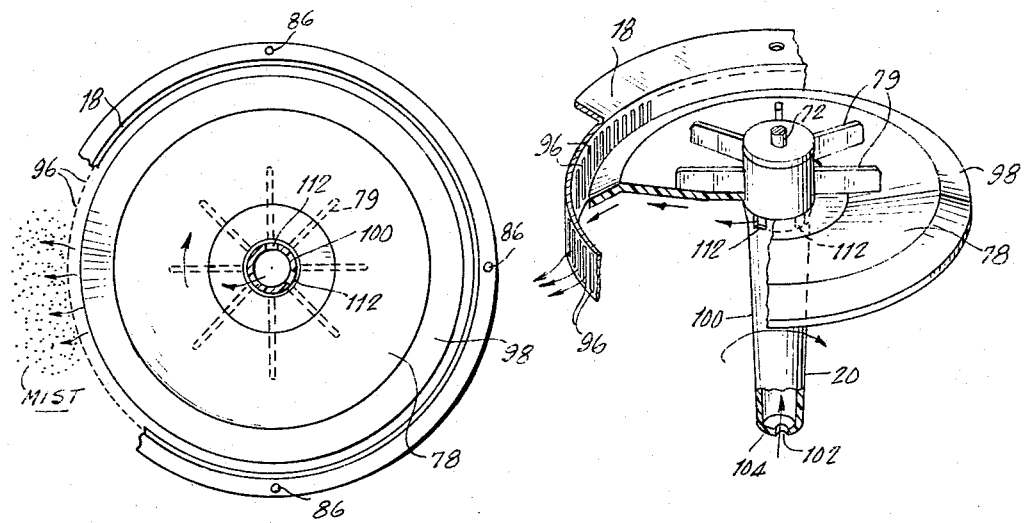
FIG. 5 is a horizontal sectional view, taken along the plane of line 5—5 in FIG. 3, illustrating particulars of construction of the impeller and baffles.
FIG. 6 is a partial perspective view with parts broken away of the baffle and impeller.

With continuing reference to the accompanying drawings wherein like reference numerals designate similar parts throughout the various views, reference numeral 10 generally designates the humidifier constructed in accordance with the concepts of the present invention. This humidifier 10 may be made out of any readily available and commercially well known material, but it has been found that for the most part, the main construction members may employ aluminum. The reason for the use of aluminum is that this substance is substantially corrosive resistant, is light in weight and is relatively strong, while being capable of being stamped or otherwise fabricated into the necessary structural shapes, which may also be of pleasing ornamental appearance.

The vaporizer 10 includes a container 12, a top portion 14, a mounting plate 16, a baffle 18, an impeller 20 and a drive motor 22 and a vane or vanes 24 as the essential parts of this device.

The container 12 has the top 14 detachably secured thereto as by a snap fit at the juncture which is sealed by a suitable resilient gasket 26 or the like. The container may be in the form of a bowl or dish and may be provided with a suitable base or footing as at 28 integrally formed and of pleasing appearance and of a stable construction. The footing 28 may be in the form of a circular shape to enhance the stability of the construction, while being of substantially semicircle cross section for streamlined appearance and ease of handling. The sides 30 of the bowl extend tapering upwardly and outwardly and terminate in the upper snap-fit portion 32, which carries the gasket 26 and which is for receiving the top 14 in a detachable manner therein.

The container 12 is designed to be filled with a suitable fluid, such as water, to which a medicament or a substance for providing a pleasing odor may be added.

The top 14 is of a suitable configuration as to provide for a highly pleasing and ornamental configuration yet which will allow the compact mounting of the drive mechanisms for the humidifier, while also allowing a circular wind tunnel to be achieved.

The top 14 has upwardly and inwardly tapering outer sides 40 from which depends the snap-fitting end 42 complementary to the snap-fit portion 32 of the container. The top 14 has a raised ring-shaped portion 44, including a slightly downwardly and inwardly sloping top portion 46 and a downwardly and inwardly sloping portion 48 which in conjunction with the upwardly sloping portion 40 form the raised ring-shaped portion of substantially inverted U-shape in cross section. A recessed portion 50 forms a continuation of the downwardly and inwardly sloping portion 48 and integrally formed therewith is a rapidly upwardly extending peaking portion 52, which terminates in a raised top portion 54 and a cover portion 56. The peaking portion 52 has a plurality of closely circumferentially spaced apertures 51 therein for letting air into the humidifier.

The raised ring-shaped portion 44 has an outward outlet opening 58 therein through which mist can pass. This opening 58 is of a suitable size so as to allow for a relatively wide angle spray of a fine mist.

Riveted or otherwise secured as at 60 to the top 14 is the mounting plate 16. The mounting plate has a circular ribbed portion 62 which provides a circular path of contact with the top 14 and divides the space between the top 14 and the mounting plate 16 into a circular wind tunnel 64 and a drive motor chamber 66. The wind tunnel 64 is one of the important features of this invention because it provides for and gives rise to the unusual effect of facilitating a wide angle spray of a fine yet dense mist because of the continuous rotation within the wind tunnel of the fine yet dense mist.

The mounting plate has riveted as at 66 or otherwise secured thereto the motor 22 which may be of any convenient construction, preferably being an electrical motor, which is connected to a suitable electric cord 68 of conventional construction passes through a grommet 70 in the top 14 so as to connect the motor 22 with a suitable source of electric current. The motor drives a shaft 72 which passes through the mounting plate 16 and has the impeller 20 fixed thereon.

The mounting plate includes a relatively flat center part at 74, which is provided with a plurality of circular apertures 76 therein located above the disc 78 of the impeller 20. The disc has a plurality of fins 79 thereon for causing admixture of fluid and water. The raised portion 80 of the mounting plate provides for directional control of the flow of the air, while also serving to provide for an enlarged air chamber 82 between the disc 78 and the mounting plate 16. Between the raised portion 80 and the contact portion 62 there is a compressed portion 84 at which point the cylindrical baffle 18 is riveted at 86 to the mounting plate. The mounting plate further includes a downwardly and outwardly slightly sloping peripheral portion 88, which terminates in a flange 90. The flange 90 is immediately adjacent and preferably in abutting contact with the inner surface of the side wall 40. The mounting plate 16 further includes a pair of vents or openings 92 therein, and depending from the mounting plate is the vane 24. Of course, a suitable number of vanes may be employed, but it has been found that a single vane 24 disposed between the two vents or openings 92 gives rise to highly efficient and effective performance of the humidifier.

The baffle 18 has a plurality of vertical slots 96 therein and the baffle closely surrounds the disc 78. The disc 78 terminates in a downwardly and outwardly sloping flange 98 closely spaced to the slot 96 and which sloping portion starts at a distance well spaced from the central portion of the impeller 20.

The impeller 20 has a hollow core 100 provided with a single centrally located aperture 102 in the base 104 thereof. The tapered cylindrical walls 106 of the impeller 20 extend upwardly above the disc 78 to form a chamber 108 above the disc and another chamber 110 below the disc 78 with the chambers communicating and with the side walls of the core 106 provided with a plurality of perforations or openings 112 therein through which water sucked in through the opening 102 can be permitted to pass in the direction of arrows 114 outwardly along the under surface of the disc 78 and then directed forcefully downwardly and against the baffle 18, where the fluid will be broken up into a fine mist and mixed with the air entering through openings 51 in the direction of the arrows 116 and thence passing through openings 76 in the direction of arrows 118. This finely divided mist will then pass through the slots 96 in the direction indicated by arrows 120. At this point, certain droplets of noticeable size, as indicated at 122, will have been formed and the centrifugal spinning direction of the droplets and mist will cause the droplets to be directed against the vane 24 whereby the droplets will cling to the vane and pass downwardly along the vane into the container 12 to mix with the fluid contained theren. However, the finely divided mist will pass upwardly into the wind tunnel. The centrifugal spinning of the mist imparted by the disc 78 will be continued and enhanced within the wind tunnel. An unusual result will happen to the finely divided mist passing in the direction of the arrows 124 upwardly into the wind tunnel 64. In the wind tunnel the speed of the particles of mist will be increased and continuing spinning action will be imparted thereto so that the mist will remain finely divided and then will pass outwardly in a wide angle spray at an increased density in a still very finely divided state outwardly through the opening 58.

In use, the top is lifted off of the container 12 and the container filled with a suitable fluid. Then, the electric cord 68 is plugged into an outlet opening and the motor then drives the impeller 20, which causes fluid to be sucked up by the impeller and flung along the under surface of the disc 78 and against the baffle 18, and thence through slots 96. The droplets will be directed downwardly back into the container by the baffle 24 while the finely divided mist will be accelerated within the wind tunnel 64 and then directed outwardly of the opening 58 in the direction indicated by arrows 126. Of course, air for mixture passes in through the inlets 51 and the openings 76 and into the space 82 between the mounting plate 16 and the impeller and thence into the container to displace the fluid being conditioned into mist.

A latitude of modification, substitution and change is intended in the foregoing disclosure, and in some instances some features of the invention will be employed without a corresponding use of other features. Accordingly, it is appropriate that the appended claims be construed broadly and in a manner consistent with the spirit and scope of the invention herein.

We claim:

1. A humidifier comprising a container, a top detachably connected to said container and having a raised central portion and a raised ring-shaped portion of substantially inverted U-shape in cross section and a recessed portion interconnecting said central portion and said ring-shaped portion, a mounting plate entirely above said container, said mounting plate being secured to said top and abutting said recessed portion about an entire circular area of contact and extending both outwardly and inwardly from said circular area of contact so as to separate the space between said mounting plate and said raised central portion into a chamber, and to separate the space between said mounting plate and said ring-shaped portion into a wind tunnel entirely spaced above and separated from said container with said mounting plate forming the bottom of said wind tunnel, said wind tunnel being isolated from said chamber by said circular area of contact, said raised ring-shaped portion having an outlet opening in the uppermost portion thereof communicating with said wind tunnel, said central portion having inlet openings therein for permitting entry of air into said chamber, said inlet openings being positioned below said outlet opening said mounting plate having apertures therein communicating said chamber with said container, said mounting plate having openings therein communicating said wind tunnel with said container, a drive means in said chamber on said mounting plate and having a hollow impeller driven thereby and depending therefrom, a slotted cylindrical baffle secured to and depending from said mounting plate and closely surrounding said impeller, said impeller being disposed below said mounting plate and extending into said container for drawing fluid in said container upwardly and then directing said fluid against said baffle so that mist and fluid droplets will be formed, and vane means depending from said mounting plate and vent means in said mounting plate for diverting said droplets into said container while said mist passes through said wind tunnel and thence through said outlet opening.

2. A humidifier according to claim 1 wherein said impeller includes a disk having a flat central portion and an upwardly extending flange remote from said flat central portion.

References Cited by the Examiner

UNITED STATES PATENTS

| | | | |
|---|---|---|---|
| 1,190,386 | 7/1916 | Dickerson | 55—230 |
| 3,110,748 | 11/1963 | Myklebust | 261—91 X |
| 3,130,245 | 4/1964 | Banks | 261—29 |
| 3,130,246 | 4/1964 | Banks | 261—91 X |
| 3,155,746 | 11/1964 | Banks | 261—91 X |
| 3,188,007 | 6/1965 | Myklebust | 55—230 X |

ROBERT F. BURNETT, *Primary Examiner.*

D. K. DENENBERG, *Assistant Examiner.*